(12) United States Patent
Bahk et al.

(10) Patent No.: US 10,371,850 B2
(45) Date of Patent: Aug. 6, 2019

(54) NEUTRALLY BUOYANT MAGNETIC SENSOR FOR BOREHOLE MAGNETOMETER

(71) Applicant: AAT CO. LTD., Seongnam-Si (KR)

(72) Inventors: Kyung Soo Bahk, Anyangisi (KR); Chang Shik Lee, Seongnam-si (KR); Kyu Jung Kim, Ansan-si (KR); Sang-Mook Lee, Seocho-gu (KR)

(73) Assignee: AAT CO. LTD. (KR)

( * ) Notice: Subject to any disclaimer, the term of this patent is extended or adjusted under 35 U.S.C. 154(b) by 7 days.

(21) Appl. No.: 15/814,553

(22) Filed: Nov. 16, 2017

(65) Prior Publication Data

US 2019/0041541 A1 Feb. 7, 2019

(30) Foreign Application Priority Data

Aug. 3, 2017 (KR) .......................... 10-2017-0098307

(51) Int. Cl.
*G01V 3/26* (2006.01)
(52) U.S. Cl.
CPC ....................................... *G01V 3/26* (2013.01)
(58) Field of Classification Search
CPC ........................................................ G01V 3/26
USPC ......................................................... 324/346
See application file for complete search history.

(56) References Cited

U.S. PATENT DOCUMENTS

| | | | | |
|---|---|---|---|---|
| 4,920,797 A | * | 5/1990 | Swartz | G01F 23/0038 324/251 |
| 6,418,788 B2 | * | 7/2002 | Articolo | G01F 23/0038 340/623 |
| 6,651,496 B2 | * | 11/2003 | Van Steenwyk | E21B 47/022 33/304 |
| 9,746,575 B2 | | 8/2017 | Lee et al. | |
| 2015/0145519 A1 | | 5/2015 | Lee et al. | |

FOREIGN PATENT DOCUMENTS

KR 101438571 9/2017

OTHER PUBLICATIONS

The English Abstract for Korean Patent KR10143857, Lee et al., Published Sep. 12, 2014.

* cited by examiner

*Primary Examiner* — Reena Aurora

(57) ABSTRACT

A magnetic sensor for borehole magnetometer includes an upper-opened pipe-shaped housing; a frame installed at an inside of the housing; an upper-opened magnetic sensor part installed at a bottom side of the frame; a lid covering the opened upper side of the magnetic sensor part; and a magnetic sensor disposed at an inside of the magnetic sensor part to measure a magnetic force, wherein an upper side and a bottom side of the magnetic sensor is respectively installed with a spring, a bottom side of the lid and the magnetic sensor part are formed with a fixing groove for fixing an upper spring and a bottom spring each installed at an upper side and a bottom side of the magnetic sensor.

1 Claim, 7 Drawing Sheets

NEUTRALLY BUOYANT MAGNETIC SENSOR FOR BOREHOLE MAGNETOMETER

PRIORITY INFORMATION

The present application claims priority, under 35 U.S.C. § 119(a), from Korean Patent Application Number 10-2017-0098307 filed on Aug. 3, 2017. The entire content of Korean Patent Application Number 10-2017-0098307 filed on Aug. 3, 2017, is hereby incorporated by reference.

BACKGROUND

Magnetic prospecting is a quick and convenient physical prospecting method and effectively used for various fields including a resource prospecting, geological structure investigation (geological survey) and civil engineering. A borehole magnetic field survey is a survey method for grasping a physical characteristic inside the earth by drilling through a deep hole in the ground, for which a borehole magnetometer is used.

The borehole magnetometer is a magnetic force measurement device used for prospecting underground resources by drilling through a deep hole in the ground or ocean floor, or for measuring changes in past terrestrial magnetic field (terrestrial magnetism) remaining in rock layers or sedimentary layer. The borehole magnetometer includes a magnetic (force) sensor capable of measuring the magnetic force, and a small fluxgate magnetometer is generally used for measuring three directional (X, Y, Z) magnetic forces.

A conventional borehole magnetometer is formed by including a housing, a frame mounted inside the housing, various electronic devices mounted on the frame and sensors. The frame is a processed plastic round rod where an upper surface is formed with grooves for inserting electronic devices and a bottom surface is grooved with grooves for tightly inserting a magnetic force sensor. The frame remains in an unprocessed rod state at a center thereof, which is to separate a magnetic force generated from the upper electronic devices from the bottom magnetic force sensor so that the magnetic force can be less influenced to the bottom magnetic force sensor. The housing is formed by including a pipe, and upper and bottom lids to cover upper and bottom sides. The upper lid of the housing is connected by a cable for supplying a power to the borehole magnetometer and for receiving and transmitting data.

In order to ascertain whether magnetic force data from depth between ascent and descent are mutually corresponding when a magnetic force is measured through the borehole magnetometer, a cable is used where the borehole magnetometer is descended to a borehole to obtain a magnetic data and to obtain the magnetic data by ascending the borehole magnetometer.

The borehole magnetometer is scratched and hit to a borehole wall when reciprocating inside the borehole to allow the housing to be exposed to shocks. However, a magnetic sensor of conventional borehole magnetometer is physically fixed to a frame inside the housing to disadvantageously allow the shock applied to the housing to be directly transmitted to the magnetic sensor through the frame.

Furthermore, another disadvantage is that the shock received in response to physical properties of the borehole wall is not constant and noise generated by the magnetic sensor is not constant either. As a result, a technical development is imperative that a physical shock generated from the borehole wall be minimized on the magnetic sensor inside the borehole magnetometer.

BRIEF DESCRIPTION OF THE DRAWINGS

The accompanying drawings, which are included to provide a further understanding of the present disclosure and are incorporated in the present disclosure and constitute a part of this application, and together with the description, serve to explain the principle of the disclosure. In the drawings.

DETAILED DESCRIPTION OF THE DRAWINGS

Figure 1:
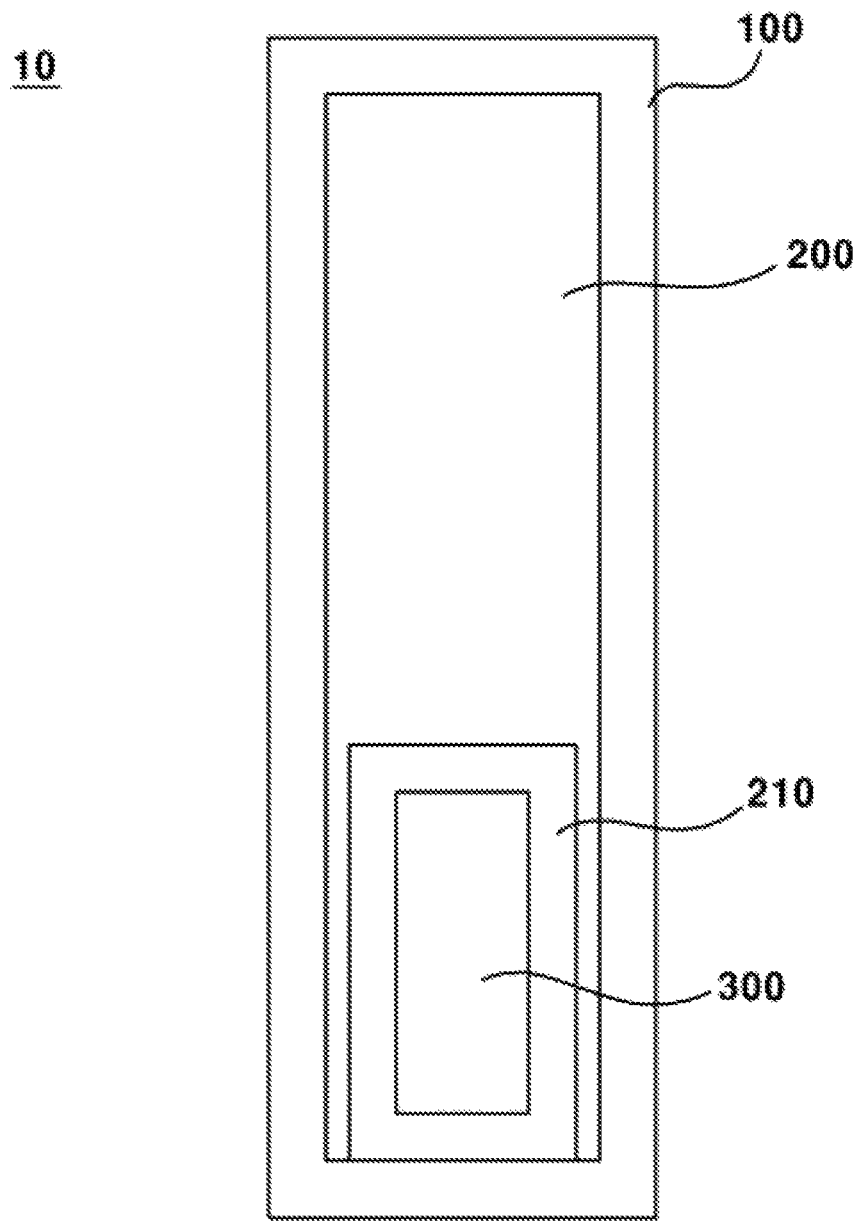
FIG. 1 is a schematic view illustrating an entire configuration of a borehole magnetometer according to an exemplary embodiment of the present disclosure.

Structures and operations of the present disclosure will be explained in detail with reference to the accompanying drawings. Detailed descriptions of well-known functions, configurations, or constructions are omitted for brevity and clarity so as not to obscure the description of the present disclosure with unnecessary detail. Thus, the present disclosure is not limited to the exemplary embodiments which will be described below, but may be implemented in other forms. In the drawings, the width, length, thickness, etc., of components may be exaggerated or reduced for the sake of convenience. Furthermore, throughout the descriptions, the same reference numerals will be assigned to the same elements in the explanations of the figures, and explanations that duplicate one another will be omitted.

Furthermore, the terms "first," "second," "A," "B," (a), (b) and the like, herein do not denote any order, quantity, or importance, but rather are used to distinguish one element from another. In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled," and "connected" may mean that two or more elements do not contact each other but are indirectly joined together via another element or intermediate elements.

Hereinafter, a magnetic sensor for borehole magnetometer according to an exemplary embodiment of the present disclosure will be described in detail with reference to the accompanying drawings.

FIG. 1 is a schematic view illustrating an entire configuration of a borehole magnetometer (10) according to an exemplary embodiment of the present disclosure.

Referring to FIG. 1, the borehole magnetometer (10) according to an exemplary embodiment of the present disclosure may include a housing (100), a frame (200) and a magnetic sensor (300). Hereinafter, the magnetic sensor for borehole magnetometer according to an exemplary embodiment of the present disclosure will be described in more detail.

The housing (100) may be formed with an upper/bottom opened non-magnetic pipe, where an inside of the housing (100) may be installed with a frame (200), an upper lid (not shown) covering an opened upper/bottom sides and a bottom lid (not shown). At this time, the housing (100) may be connected to a cable supplying a power to the borehole magnetometer through the upper lid, or transmitting/receiving a measured data. To this end, the upper lid may be formed with a through hole (not shown) which the cable can pass therethrough.

The frame (200) may be installed inside the housing (100). The frame (200) in the present disclosure may be made from processing a cylindrical plastic rod, where the frame (200) may be concaved at an upper surface with grooves to install various electronic devices and at a bottom surface with grooves to install a magnetic sensor part (210) arranged with the magnetic sensor (300). According to an exemplary embodiment, the frame (200) may be installed at an upper surface with a gyro sensor and an inclinometer in order to correct an azimuth of a geomagnetism in response to rotation when the borehole magnetometer is rotated, and to accurately measure an azimuth of the geomagnetism. The frame (200) may remain at a midsection with an un-processed rod, which is to separate a magnetism generated from various electronic devices mounted at an upper surface of the frame (200) so that the magnetism can be less affected to the magnetic sensor (300) mounted at an inside of the magnetic sensor part (210) positioned at a bottom surface of the frame (200).

Meantime, as mentioned above, the frame (200) of the present disclosure may be installed at a bottom surface with a magnetic sensor part (210) mounted at an inside of the magnetic sensor (300). Hereinafter, the magnetic sensor part (210) will be described in more detail.

The magnetic sensor part (210) may be installed at a bottom surface of the frame (200), and an inside of the magnetic sensor part (210) may be disposed with a magnetic sensor (300) to measure the magnetism. Here, the magnetic sensor part (210) may further include a lid (211) having an upper-opened cylindrical shape to cover an opened upper surface. The lid (211) may be formed with a groove to fix an upper spring (310, described later) installed at an upper surface of the magnetic sensor (300, described later). The groove will be described later in more detail with reference to FIG. 2.

Furthermore, the lid (211) according to an exemplary embodiment may be coupled by screw-connection to the magnetic sensor part (210). At this time, the magnetic sensor part (210) and the lid (211) may be coupled by a screw-connection method in which a screw is press-fitted into a coupling hole (212) formed at both lateral surfaces of the upper surface of the magnetic sensor part (210). Here, the both lateral surfaces of the lid (211) may be formed with an accommodation groove to allow a distal end of a screw coupled through the coupling hole (212) of the magnetic sensor part (210) to be accommodated, and a screw thread may be formed at an inside of the accommodation groove to allow the screw to be screw-connected.

However, the screw-connection is an exemplary embodiment, and various other coupling methods may be applied to the present disclosure as long as the magnetic sensor part (210) and the lid (211) can be more stably coupled.

Furthermore, the lid (211) may be formed at a center with a through hole (213) to pass a cable of the magnetic sensor (300). At this time, a power may be supplied through the cable or, the measured data may be received and/or transmitted through the magnetic sensor (300). Here, the through hole (213) formed at the lid (211) may be sealed using an elasticity-laden adhesive or waterproof connector in order to prevent the liquid filled inside the magnetic sensor part (210) from leaking after passing through the cable. Furthermore, an O-ring (214) may be coupled to the lid (211) in order to prevent the liquid filled inside of the magnetic sensor part (210) from leaking through a gap between the lid (211) and the magnetic sensor part (210).

However, using an O-ring is one of the methods to prevent the liquid inside of the magnetic sensor part (210), and various other methods may be used for the present disclosure in order to prevent liquid inside of the magnetic sensor part (210) from leaking to the outside.

Figure 2:
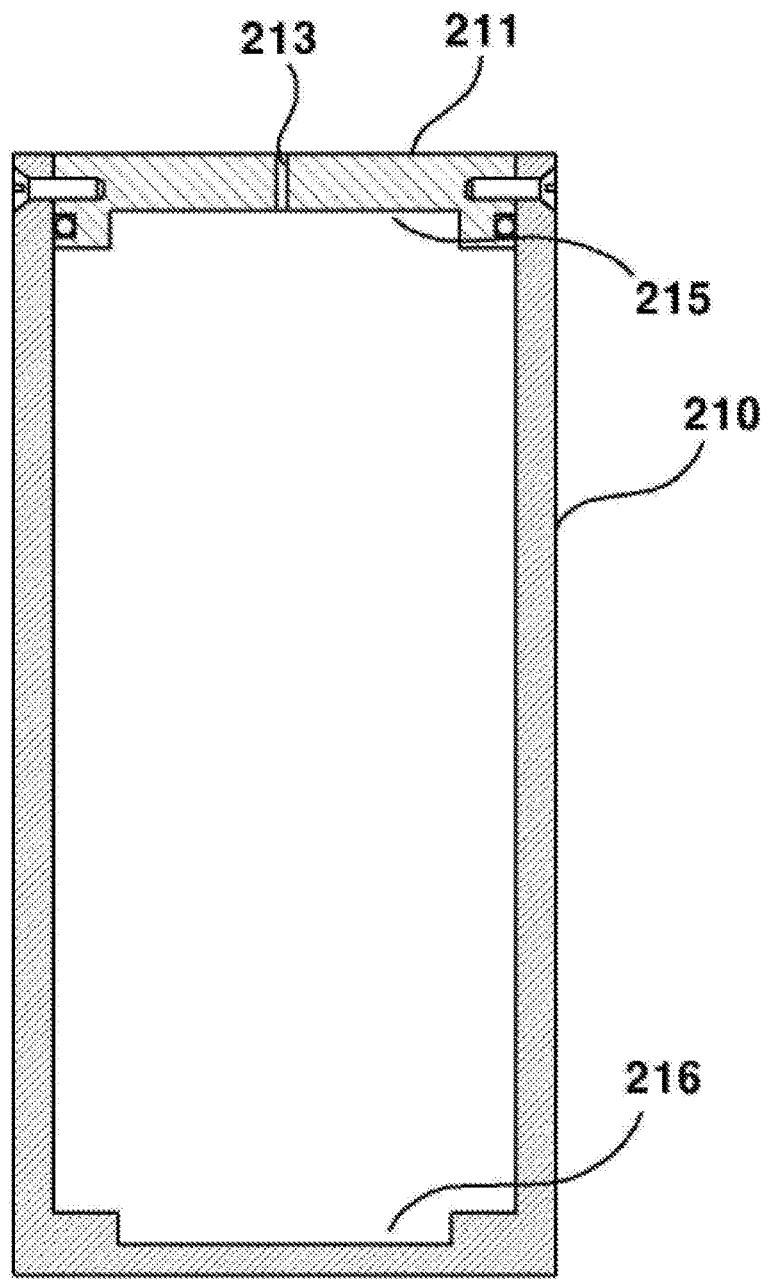
FIG. 2 is a schematic view illustrating a spring fixing groove formed at a lid of a cylinder-shaped magnetic sensor part and a spring fixing groove formed at a bottom side, in a borehole magnetometer including a magnetic sensor according to an exemplary embodiment of the present disclosure.

FIG. 2 is a schematic view illustrating a spring fixing groove formed at a lid of a cylinder-shaped magnetic sensor part and a spring fixing groove formed at a bottom side, in a borehole magnetometer including a magnetic sensor according to an exemplary embodiment of the present disclosure.

Referring to FIG. 2, a fixing groove (215, 216) may be formed respectively at the lid (211) and a bottom of the magnetic sensor part (210). Albeit explained later, an upper spring (310) and a bottom spring (320) may be installed at an upper surface and a bottom surface of the magnetic sensor (300) where the upper spring (310) may be fixedly installed at a fixing groove (215) formed at the lid (211), and the bottom spring (320) may be fixedly formed at a fixing groove (216) formed at a bottom surface of the magnetic sensor part (210). Here, each shape of the fixing grooves (215, 216) may take a shape of cylinder insertible by a part of the upper spring (310) and the bottom spring (320) as illustrated and explained later through FIG. 4. Furthermore, an outer size of the fixing grooves (215, 216) may be same as or a little bit greater than that of the upper spring (310) and the bottom spring (320) to allow the upper spring (310) and the bottom spring (320) to be tightly inserted.

Hereinafter, the magnetic sensor (300) will be described in detail with reference to FIGS. 3 and 4.

Figure 3:
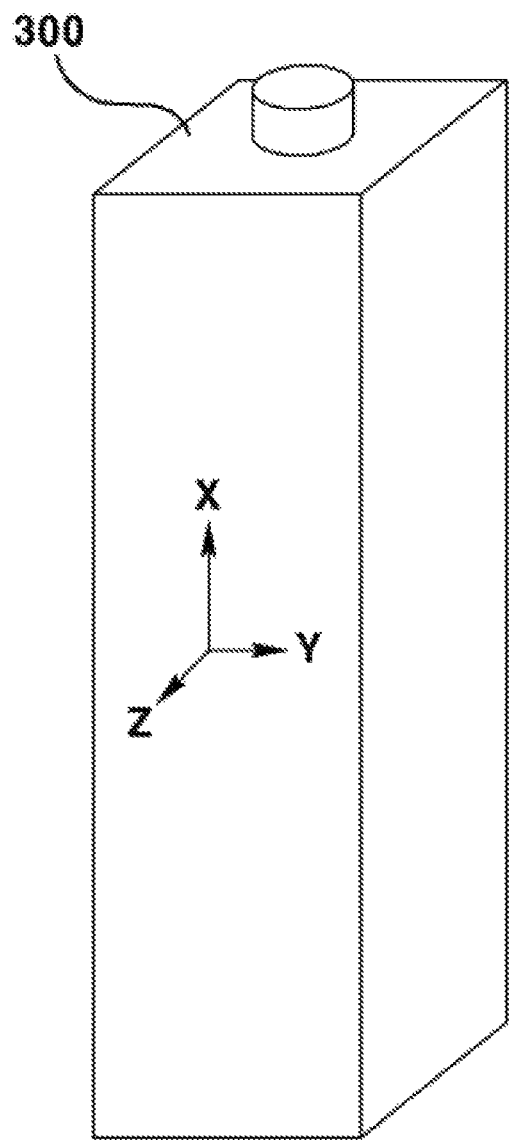
FIG. 3 is a schematic view illustrating a magnetic sensor according to an exemplary embodiment of the present disclosure.
Figure 4:
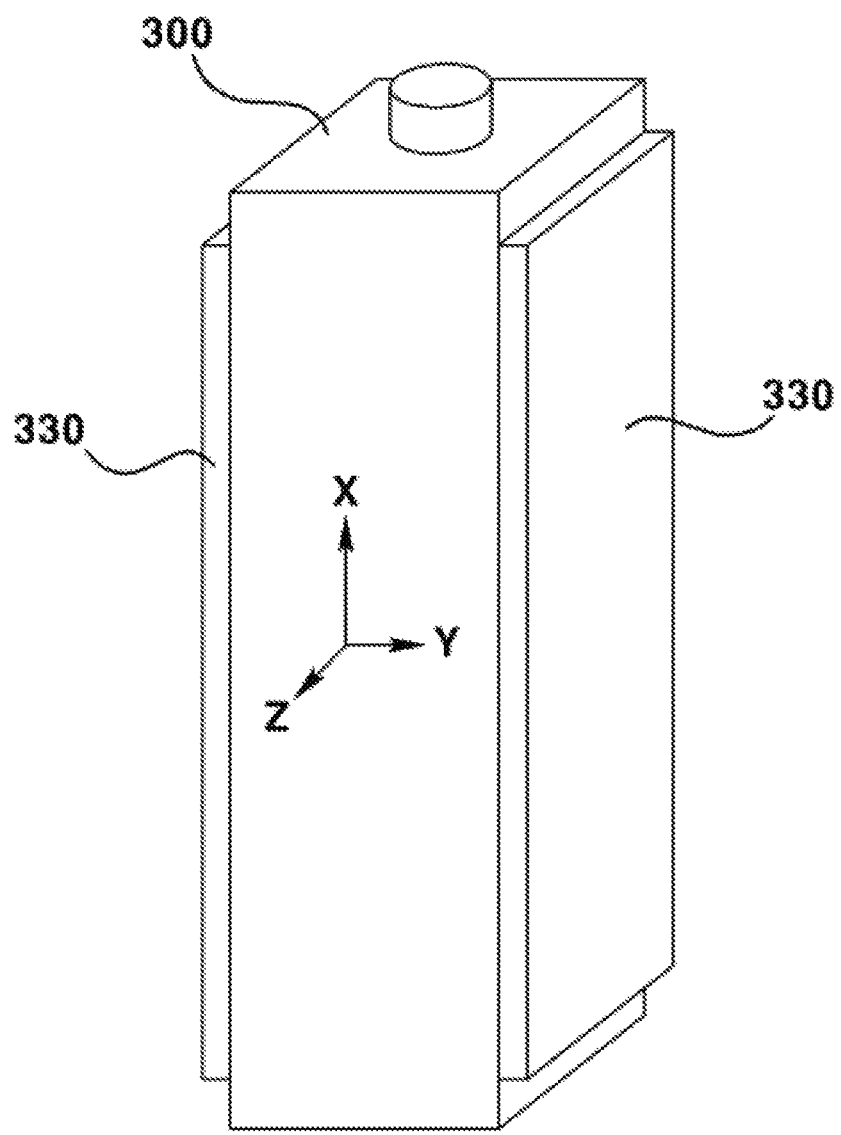
FIG. 4 is a schematic view illustrating a spring stopper attached to both lateral surfaces of magnetic sensor according to an exemplary embodiment of the present disclosure.

FIG. 3 is a schematic view illustrating a magnetic sensor according to an exemplary embodiment of the present disclosure, and FIG. 4 is a schematic view illustrating a spring stopper attached to both lateral surfaces of magnetic sensor according to an exemplary embodiment of the present disclosure.

The magnetic sensor (300) may be disposed at an inside of the magnetic sensor part (210) to function to measure the magnetism. As illustrated in FIG. 3, the magnetic sensor (300) according to an exemplary embodiment of the present disclosure may take a shape of a cube.

The magnetic sensor (300) in the present exemplary may be of a small size, and may be used of a fluxgate magnetometer that can measure a 3-axis (X, Y, Z) direction. However, the present disclosure is not limited thereto, and other various magnetic sensors (300) may be used for the present disclosure.

Meantime, as illustrated in FIG. 4, both lateral surfaces of the magnetic sensor (300) may be formed with a spring stopper (330). At this time, the spring stopper (330) may function to prevent the upper spring (310) and the bottom spring (320) mounted at the magnetic sensor (300) from rotating. Toward this end, the spring stopper (330) may be formed with a groove (not shown) to fix the upper spring (310) and the bottom spring (320) when the upper spring (310) and the bottom spring (320) are inserted into the magnetic sensor (300).

In general, a measured data of the magnetic sensor (300) may be outputted in the form of one vertical component and two directional horizontal components. At this time, although an entire magnetism may be calculated by a 3-component combined magnetism, an azimuth of geomagnetism is largely calculated using a two-directional horizontal component when the azimuth of geomagnetism is calculated, such that there is a need of fixing the magnetic sensor (300) lest the magnetic sensor (300) be rotated when the magnetic sensor (300) is installed inside of the magnetic sensor part (210).

When the coupling among the magnetic sensor (300) and the upper spring (310) and the bottom spring (320) is not strong enough, the magnetic sensor (300) may be rotated, where in order to prevent the magnetic sensor (300) from rotating, an area where the upper spring (310) and the bottom spring (320) contact the spring stopper (330) may be fixed using an adhesive, or may be formed with a groove (not shown) at the spring stopper (330), if necessary, to prevent rotation by the magnetic sensor (300) being hitched at the groove. Here, although the spring stopper (330) may be used with various materials, a light, hard, and magnetism-free plastic material may be largely used.

Meantime, the magnetic sensor (300) may be installed at an upper surface and a bottom surface with the upper spring (310) and the bottom spring (320). At this time, the springs may be preferably used with a magnetism-free, PC (Polycarbonate) plastic material of high mechanical strength. To be more specific, the upper spring (310) and the bottom spring (320) may be inserted into the upper and bottom surfaces of the magnetic sensor (300), where the upper spring (310) and the bottom spring (320) are inserted until reached an abutted to both distal ends of the spring stopper (330) attached to both lateral surfaces of the magnetic sensor (300).

Thus, according to the present disclosure, the vertical physical shocks generated by the upper spring (310) and the bottom spring (320) installed at the magnetic sensor (300) when the borehole magnetometer reciprocates the borehole can be absorbed to allow the magnetic sensor (300) to be less affected by a noise generated by the physical shocks.

Hereinafter, the installation of the upper spring (310) and the bottom spring (320) at the magnetic sensor (330) will be described in detail with reference to FIGS. 5 and 6.

Figure 5:
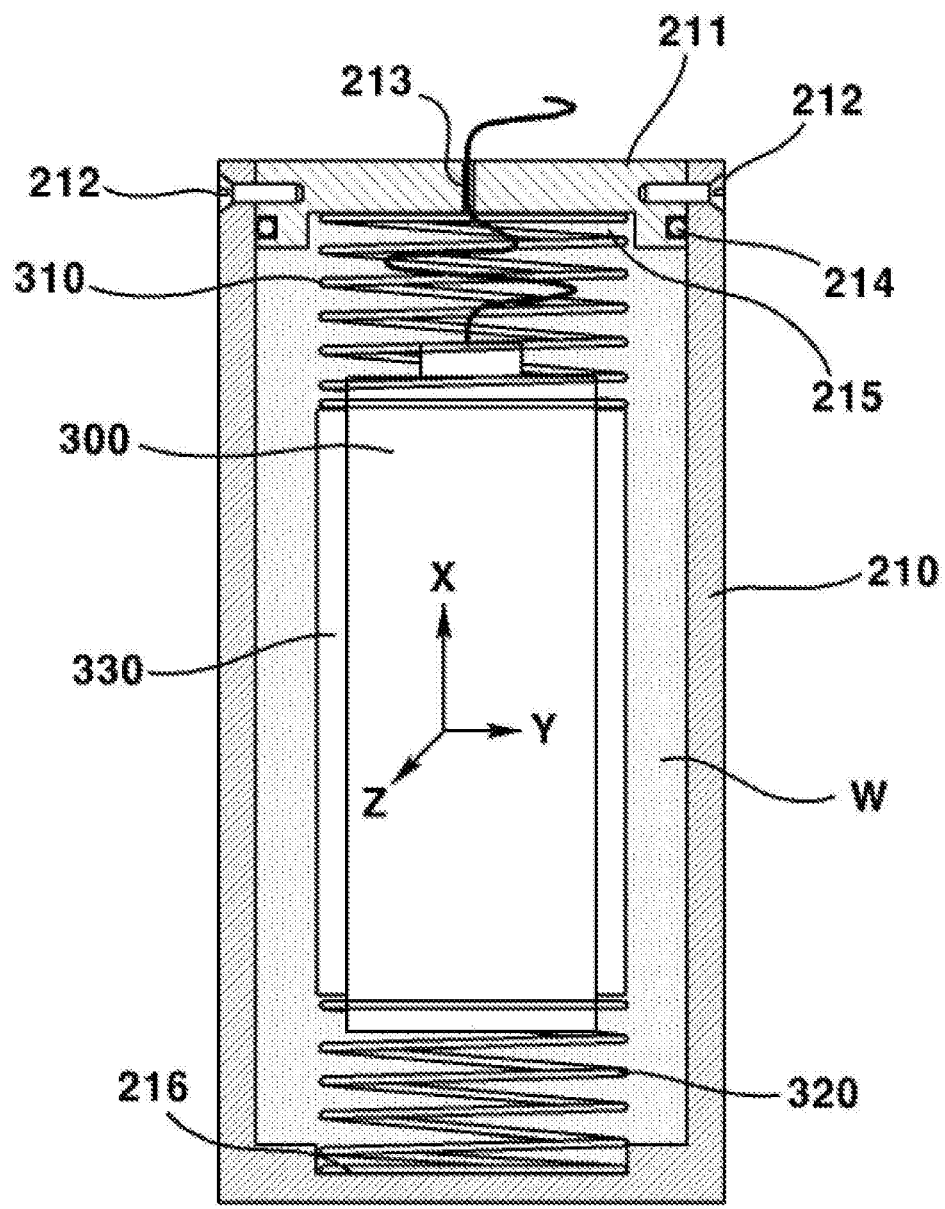
FIG. 5 is a front view illustrating a spring installed at an upper surface and a bottom surface of a magnetic sensor arranged inside a magnetic sensor part in the magnetic sensor for borehole magnetometer according to an exemplary embodiment of the present disclosure, and a figure (image) filled with a liquid inside the magnetic sensor part.
Figure 6:
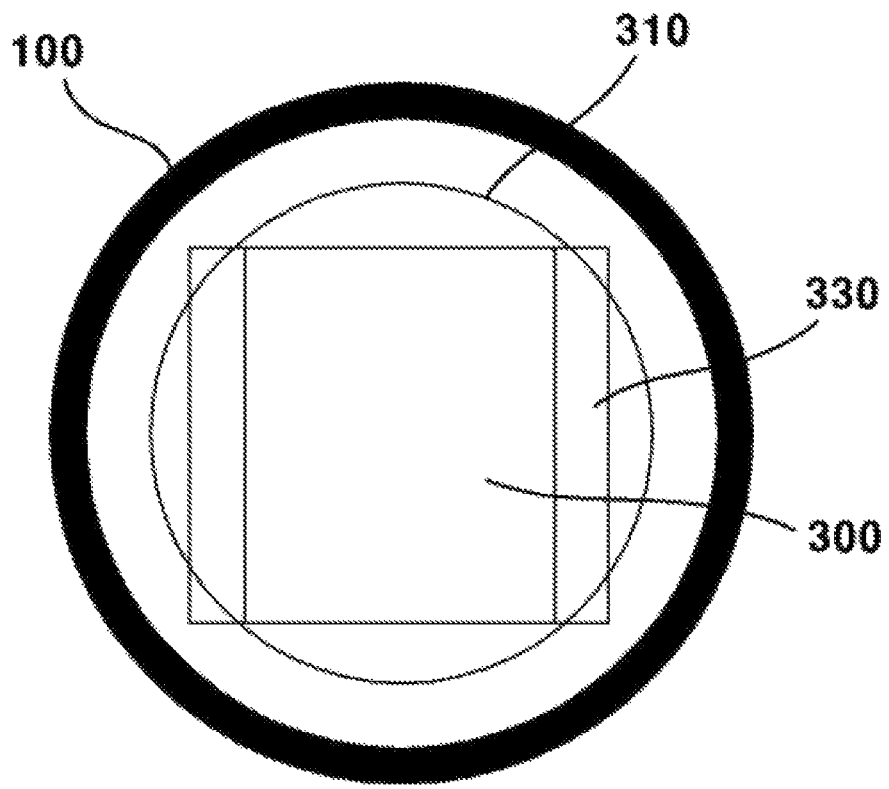
FIG. 6 is a plane view illustrating a figure of a spring installed at an upper surface of a magnetic sensor arranged inside a magnetic sensor part in the magnetic sensor for borehole magnetometer according to an exemplary embodiment of the present disclosure.

FIG. 5 is a front view illustrating a spring installed at an upper surface and a bottom surface of a magnetic sensor arranged inside a magnetic sensor part in the magnetic sensor for borehole magnetometer according to an exemplary embodiment of the present disclosure, and a figure (image) filled with a liquid inside the magnetic sensor part, and FIG. 6 is a plane view illustrating a figure of a spring installed at an upper surface of a magnetic sensor arranged inside a magnetic sensor part in the magnetic sensor for borehole magnetometer according to an exemplary embodiment of the present disclosure.

Referring to FIG. 5, the upper spring (310) and the bottom spring (320) may be respectively installed at an upper surface and a bottom surface of the magnetic sensor (300). To be more specific, one surface of the upper spring (310) may be inserted into the fixing groove (215) formed at the lid (211), and the other surface of the upper spring (310) may be inserted into an upper surface of the magnetic sensor (300) until reached and abutted to an upper end of the spring stopper (330).

Here, a minor diameter of the upper spring (310) must be so formed as to allow the upper spring (310) to be strongly coupled to the upper surface of the magnetic sensor (300), and as illustrated in FIG. 6, a minor diameter of the upper spring (310) may be preferably so formed as to be matched or similarly matched to a diagonal length of the upper end at the magnetic sensor (300).

In the same method, one surface of the bottom spring (320) may be fixed by being inserted into the fixing groove (216) formed at the bottom end of the magnetic sensor part (210), and the other surface may be inserted into a bottom surface of the magnetic sensor (300) until reached and abutted to a bottom end of the spring stopper (330). At this time, a minor diameter of the bottom spring (320) must be so formed as to allow the bottom spring (320) to be strongly coupled to the bottom surface of the magnetic sensor (300), such that a minor diameter of the bottom spring (320) may be also preferably so formed as to be matched or similarly matched to a diagonal length of the bottom end at the magnetic sensor (300).

According to an exemplary embodiment, an area, where the upper spring (310) and the spring stopper (330) are abutted, may be fixed using an adhesive, or according to another exemplary embodiment, a part of the upper spring (310) may be fixed by being hitched at a groove (not shown) formed at the spring stopper (330).

In the same method, the bottom spring (320) may be fixed by being inserted into the fixing groove (216) formed at the bottom end of the magnetic sensor part (210), and according to an exemplary embodiment, an area, where the bottom spring (320) and the spring stopper (330) are abutted, may be fixed using an adhesive, or according to another exemplary embodiment, a part of the bottom spring (320) may be fixed by being hitched at a groove (not shown) formed at the spring stopper (330).

As illustrated in FIG. 5, the magnetic sensor part (210) may be fully filled therein with a liquid (w). At this time, the liquid (w) may be a liquid having the same specific gravity as that of the magnetic sensor (300), and function to damper the vibration when the magnetic sensor (300) vertically vibrates. In general, when a vertical physical shock generated when the borehole magnetometer reciprocates the borehole is applied, the magnetic sensor (300) vertically vibrates, where the vibration can last longer in the air, such that, in order to quickly damper the vibration, the magnetic sensor part (210) is filled therein with a liquid (w) to allow the magnetic sensor (300) to be submerged in the liquid (w).

The liquid in the exemplary embodiments is used with FC-40 (manufactured by 3M) having a great specific gravity and excellent in electrical isolation, which is then adequately mixed with kerosene. The specific gravity of FC-40 is approximately 1.855 while that of kerosene is approximately 0.83, such that the specific gravity of approximately 1.4 in the magnetic sensor can be matched by mixing the two liquids.

Furthermore, an upper spring is in an elongated state in the air at normal times due to gravity and the bottom spring is in a pressed state, which creates a problem. In order to solve this problem, an applied buoyance is made to be neutral by submerging the magnetic sensor (300) in a liquid having a same specific gravity as that of the magnetic sensor (300). The magnetic sensor (300) in the neutral buoyance state can be installed in a state of not being floated or not being submerged.

Hereinafter, the effect of neutral buoyance will be described in detail with reference to FIG. 7.

Figure 7:
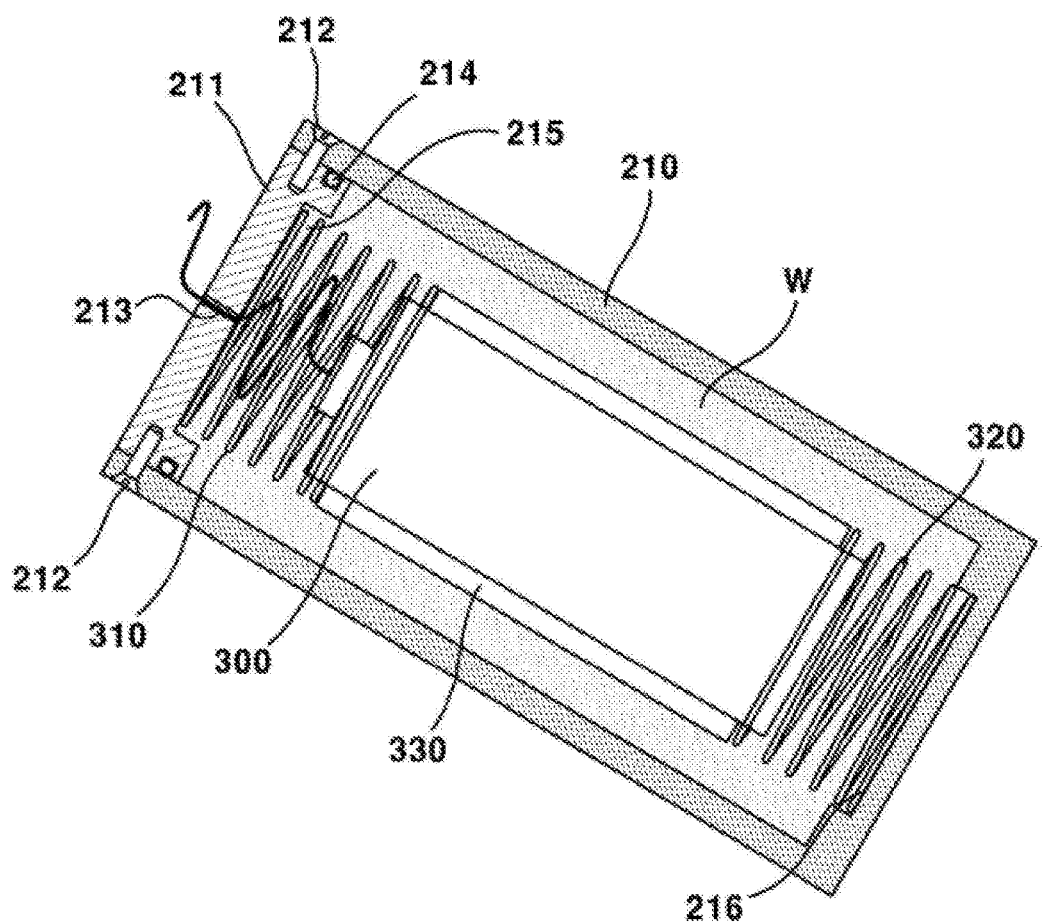
FIG. 7 is a schematic view illustrating a figure of a magnetic sensor part when it is tilted in a magnetic sensor for borehole magnetometer according to an exemplary embodiment of the present disclosure.

FIG. 7 is a schematic view illustrating a figure of a magnetic sensor part when it is tilted in a magnetic sensor for borehole magnetometer according to an exemplary embodiment of the present disclosure.

As illustrated in FIG. 7, the magnetic sensor part (210) is filled with a liquid (w), and when an inside of the magnetic sensor part (210) is not filled with the liquid (w), the magnetic sensor (300) may be drooped downward due to gravity to abut to an inner wall of the magnetic sensor part (210) when the magnetic sensor part (210) is tilted as shown in FIG. 7.

In order to prevent the magnetic sensor (300) from contacting an inner wall of the magnetic sensor part (210), a relatively strong spring must be installed, and it is difficult to expect a cushioning effect when the spring is strong. However, in the present disclosure, when the magnetic sensor part (210) is fully filled therein with a liquid (w) to allow the magnetic sensor (300) to float due to the neutral buoyance, a soft spring may be used to expect a cushioning effect, and as illustrated in FIG. 7, even if the magnetic sensor part (210) is tilted, the magnetic sensor (300) can be made not to be touched to an inner wall of the magnetic sensor part (210).

The magnetic sensor for borehole magnetometer according to the present disclosure has an advantageous effect in that a spring is installed at each of upper and bottom sides of a magnetic sensor to absorb a vertically-directed physical shock generated while the borehole magnetometer reciprocates a borehole.

In addition, there is another advantageous effect in that the specific gravity of a liquid filling an inside of the magnetic sensor part is made to be same as that of the magnetic sensor to quickly damper a vibration generated from a physical shock generated while the borehole magnetometer reciprocates a borehole.

Although the present disclosure has been explained with all constituent elements forming the exemplary embodiments of the present disclosure being combined in one embodiment, or being operated in one embodiment, the present disclosure is not limited thereto. That is, in some cases, the described features, structures, or operations may be combined in any suitable manner in one or more embodiments. It will also be readily understood that the components of the embodiments, as generally described and illustrated in the figures herein, could be arranged and designed in a wide variety of different configurations.

Terms used in the specification are only provided to illustrate the embodiments and should not be construed as limiting the scope and spirit of the present disclosure. In the specification, a singular form of terms includes plural forms thereof, unless specifically mentioned otherwise. In the term "includes," "including," "comprises" and/or "comprising" as used herein, the mentioned component, step, operation, and/or device is not excluded from presence or addition of one or more other components, steps, operations and/or devices.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In summary, the above-described magnetic sensor for borehole magnetometer minimizes a physical shock generated by a borehole magnetometer reciprocating the borehole that is transmitted to the magnetic sensor installed inside a magnetic sensor part by separating a bottom side fixed with the magnetic sensor of the borehole magnetometer from a frame and making it become a magnetic sensor part and by making the magnetic sensor part independent from the housing of the borehole magnetic sensor, by installing a spring at each of an upper side and a bottom side of the magnetic sensor part with a spring, and by neutralizing a buoyancy received by the magnetic sensor by filling an inside of the magnetic sensor part with liquid having a same specific gravity as that of the magnetic sensor.

A magnetic sensor for borehole magnetometer, the magnetic sensor for borehole magnetometer includes an upper-opened pipe-shaped housing; a frame installed at an inside of the housing; an upper-opened magnetic sensor part installed at a bottom side of the frame; a lid covering the opened upper side of the magnetic sensor part; and a magnetic sensor disposed at an inside of the magnetic sensor part to measure a magnetic force, wherein an upper side and a bottom side of the magnetic sensor is respectively installed with a spring, a bottom side of the lid and the magnetic sensor part are formed with a fixing groove for fixing an upper spring and a bottom spring each installed at an upper side and a bottom side of the magnetic sensor, the magnetic sensor part is filled therein with a liquid to damp a vibration when the vibration is generated during vertical movement of the magnetic sensor, the magnetic sensor is attached at both lateral sides with a spring stopper to prevent the upper and bottom springs from rotating, and wherein the upper and bottom springs are press-fitted into upper and bottom sides of the magnetic sensor up to both distal ends of the spring stopper, and wherein the spring stopper is formed with a groove fixing the upper and bottom springs, the lid is formed at a center with a through hole to pass a magnetic sensor cable, and wherein the specific gravity of the liquid filling the inside of the magnetic sensor part is same as that of the magnetic sensor to enable the magnetic sensor to neutralize buoyance inside the liquid, the lid is screw-connected with the magnetic sensor part, and wherein the magnetic sensor for borehole magnetometer further comprise upper and bottom lids covering upper-opened upper side and the bottom side of the housing.

The magnetic sensor for borehole magnetometer includes a spring is installed at each of upper and bottom sides of a magnetic sensor to absorb a vertically-directed physical shock generated while the borehole magnetometer reciprocates a borehole.

In addition, the specific gravity of the liquid filling the inside of the magnetic sensor part is made to be same as that of the magnetic sensor to quickly damper a vibration generated from a physical shock generated while the borehole magnetometer reciprocates a borehole.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings, and the appended claims.

What is claimed is:

1. A magnetic sensor for borehole magnetometer, the magnetic sensor for borehole magnetometer comprising:

an upper/bottom-opened pipe-shaped housing;

a frame installed at an inside of said upper/bottom-opened pipe-shaped housing;

an upper-opened magnetic sensor part installed at a bottom side of said frame;

a lid covering an opened upper side of said upper-opened magnetic sensor part;

a magnetic sensor disposed at an inside of the said upper-opened magnetic sensor part to measure a magnetic force;

an upper spring coupled to an upper side of said magnetic sensor;

a bottom spring coupled to a bottom side of said magnetic sensor;

a first fixing groove is formed on a bottom surface of said lid, said first fixing groove being coupled to an upper end of said upper spring;

a second fixing groove is formed at a lower portion of said upper-opened magnetic sensor part, said second fixing groove being coupled to a lower end of said bottom spring; and said magnetic sensor part being filled therein with a liquid to damp a vibration when the vibration is generated during vertical movement of said magnetic sensor;

a spring stopper, attached at both lateral sides of said magnetic sensor, to prevent said upper spring and said bottom spring from rotating; and said upper spring and said bottom spring being fitted into upper and bottom sides of said magnetic sensor up to both distal ends of said spring stopper; and said spring stopper including a groove to fix said upper spring and said bottom spring;

said lid including, at a center thereof, a through hole to pass a magnetic sensor cable therethrough;

said liquid filling said magnetic sensor part having a same specific gravity as said magnetic sensor to enable said magnetic sensor to neutralize buoyance inside said liquid;

said lid being screw-connected with said magnetic sensor part;

said magnetic sensor including an upper lid and a bottom lid, said upper lid covering an opened upper side of said upper/bottom-opened pipe-shaped housing, said bottom lid covering an opened side of said upper/bottom-opened pipe-shaped housing.

\* \* \* \* \*